United States Patent [19]

Hedberg et al.

[15] 3,678,088

[45] July 18, 1972

[54] POLYCHLORINATED METALLOCENES AND THEIR SYNTHESIS

[72] Inventors: Frederick L. Hedberg, Tucson, Ariz.; Harold Rosenberg, Dayton, Ohio

[73] Assignee: The United States of America as represented by the Air Force

[22] Filed: Feb. 24, 1971

[21] Appl. No.: 118,495

[52] U.S. Cl................260/429 CY, 106/15 FP, 252/49.7, 260/2 M, 260/439 CY
[51] Int. Cl........................................C07f 15/02, C07f 15/00
[58] Field of Search..................260/439 CY, 429 CY, 649 R

[56] References Cited

UNITED STATES PATENTS

| | | | |
|---|---|---|---|
| 2,922,805 | 1/1960 | Kaufman | 260/439 CY |
| 3,285,946 | 11/1966 | De Witt et al. | 260/439 CY |
| 3,313,835 | 4/1967 | Wilkus et al. | 260/439 CY |
| 3,422,129 | 1/1969 | Rosenburg | 260/439 CY |
| 3,509,188 | 4/1970 | Halasa et al. | 260/439 CY |
| 3,535,356 | 10/1970 | Hartle et al. | 260/439 CY |

OTHER PUBLICATIONS

Nesme Yanov et al. Acad. of Sciences Bulletin, U.S.S.R. Jan–June 1956, pp. 749–751

Primary Examiner—Tobias E. Levow
Assistant Examiner—A. P. Demers
Attorney—Harry A. Herbert, Jr. and Cedric H. Kuhn

[57] ABSTRACT

Novel polychlorinated metallocenes are provided that have the following formulas: $C_5H_{5-m}Cl_mMC_5H_5$ and $(C_5H_{5-n}Cl_n)_2M$, wherein M is iron, ruthenium or osmium, $m$ is an integer from 3 to 5, inclusive, and $n$ is an integer from 2 to 5, inclusive. The products are prepared by (1) reacting a monochlorometallocene or a 1,1'-dichlorometallocene with an organolithium compound in the presence of a solvent, (2) recovering a 1-chloro-2-lithiometallocene or a 1,1'-dichloro-2,2'-dilithiometallocene. depending upon the starting material used, and (3) then reacting one of the latter compounds with a chlorination agent to obtain 1,2-dichlorometallocene or 1,1',2,2'-tetrachlorometallocene. The lithiation step and the chlorination step can then be repeated one, two, 3 or more times, using in each reaction as the starting material the isolated chlorinated product from the prior reaction. The polychlorinated metallocenes are useful in preparing metallocene-containing polymers that are particularly suitable as ablative plastics for heat shields and structural laminates for light weight radiation shields. They also can be used to synthesize high temperature and/or high density fluids as well as for additives for lubricants and as flame retardant additives. The decachlorometallocenes are particularly useful because of their high resistance to oxidation.

22 Claims, No Drawings

POLYCHLORINATED METALLOCENES AND THEIR SYNTHESIS

FIELD OF THE INVENTION

This invention relates to polychlorinated metallocenes. In one aspect it relates to a process for the synthesis of these compounds.

BACKGROUND OF THE INVENTION

While the thermal stability of metallocenes and metallocene polymers is well known, the utilization of metallocene derivatives for high temperature materials has been restricted by their instability toward chemical and air oxidation. The resistance of a metallocene toward chemical oxidation can be increased by the incorporation of electron-withdrawing substituents on the metallocene ring. It has been shown that the effect of two such substituents on the oxidation potential is approximately additive whether the substituents are located heteroannularly or homoannularly. Although one might expect a substantial enhancement of oxidation resistance with the additional substitution of the ferrocene ring by electron-withdrawing substituents, up to the present time this phenomenon has not been demonstrated since such compounds have not been available. Furthermore, no process has been suggested whereby compounds, such as decachloroferrocene, can be prepared. The only known deca-substituted metallocene derivatives, namely 1,1',2,2'3,3',4,4',5,5'-decamethylferrocene and -decaethylferrocene, contain only electron-donating alkyl groups which increase the ease of oxidation of these compounds.

It is an object of this invention, therefore, to provide polychlorinated metallocenes that are highly resistant to oxidation.

Another object of the invention is to provide a process for preparing polychlorinated metallocenes.

A further object of the invention is to provide polychlorinated metallocenes that are stable at elevated temperatures.

Other objects and advantages of the invention will become apparent to those skilled in the art upon consideration of the accompanying disclosure.

SUMMARY OF THE INVENTION

In one embodiment the present invention resides in a polychlorinated metallocene selected from compounds having the following structural formulas:

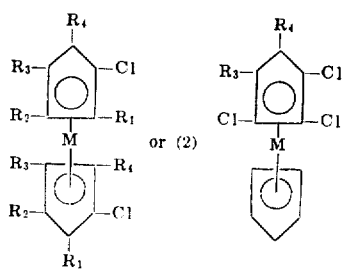

wherein M is a metal selected from the group consisting of iron, ruthenium and osmium; $R_1$ is Cl, I, $OCH_3$, $OC_2H_5$, Li, or COOH, and $R_2$,$R_3$ and $R_4$ are each Cl or H, the $R_1$ group being I, methoxy, ethoxy, Li or COOH only when $R_2$,$R_3$ and $R_4$ are each Cl, and when a $R_2$,$R_3$ or $R_4$ is Cl, each Cl atom is adjacent to a Cl atom.

Examples of compounds according to formula (1) include 1,1',2,2'-tetrachloroferrocene; 1,1',2,2'1,1',2,2',3,3'-hexachloroferrocene; 1,1',2,2',3,3',4,4'-octachloroferrocene; 1, 1',2,2',3,3',4,4',5,5'-decachloroferrocene; 1,1'-diiodooctachloroferrocene; 1,1'-dimethoxyoctachloroferrocene; 1,1'-diethoxyoctachloroferrocene; 1,1'-dilithiooctachloroferrocene; octachloroferrocene-1,1'-dicarboxylic acid; and the corresponding derivatives of ruthenocene and osmocene.

Examples of compounds according to Formula (2) include 1,2,3-trichloroferrocene; 1,2,3,4-tetrachloroferrocene, 1,2,3,4,5 pentachloroferrocene; and the corresponding derivatives of ruthenocene and osmocene.

The preferred metallocenes are those that have the structure of Formula (1), i.e., compounds in which hydrogen atoms on both rings have been substituted with chlorine atoms. And of the preferred compounds, decachloroferrocene and decachlororuthenocene are the more desirable because of their outstanding thermal stability and high resistance to oxidation as well as their ability to function as intermediates in the preparation of important derivatives.

In another embodiment, the present invention resides in a process for preparing the polychlorinated metallocenes. Broadly speaking, the process comprises the following steps: (1) reacting a chlorinated metallocene selected from the group consisting of 1,1'-dichloroferrocene, 1,1'-dichlororuthenocene, 1,1'-dichlorosmocene, chloroferrocene, chlororuthenocene, and chlorosmocene with an organolithium compound in the presence of a solvent for the chlorinated metallocenes; (2) adding a chlorinating agent to the resulting reaction mixture; (3) and recovering a reaction mixture containing a 1,1',2,2'-tetrachlorometallocene when the chlorinated metallocene selected is a dichlorometallocene and a 1,2-dichlorometallocene when the chlorinated metallocene selected is a chlorometallocene. The chlorinated metallocene is thereafter recovered from the reaction mixture as the product of the process. The separation can be accomplished by any suitable means. However, it is usually preferred to carry out the separation by (a) filtering the reaction mixture, e.g., by passing it though a bed of alumina, (b) concentrating the filtrate to dryness, (c) fractionally sublimining the residue to remove any remaining solvent, and (d) recovering the product by recrystallization from an aliphatic hydrocarbon such as hexane.

When it is desired to obtain a chlorinated metallocene which is further substituted with chlorine atoms, the 1,1'2,2'-tetrachlorometallocene or the 1,2, dichlorometallocene obtained as described above is reached with an organolithium compound in the presence of a solvent. The chlorinating agent is then added to the resulting reaction mixture, and there is recovered a reaction mixture containing a 1,1',2,2',3,3'-hexachlorometallocene when 1,1',2,2'-tetrachlorometallocene is the starting material and a 1,2,3-trichlorometallocene when 1,2-dichlorometallocene is the starting material. The lithiation, chlorination and separation steps are repeated two more times to obtain (1) a 1,1',2,2',3,3',4,4'-octachlorometallocene or 1,2,3,4-tetrachlorometallocene and (2) a 1,1',2,2' ,3,3',4,4',5,5'-decachlorometallocene or a 1,2,3,4,5-pentachlorometallocene.

As described hereinabove, the higher chlorine-containing metallocenes are prepared using as a starting material the next lower chlorine-containing metallocene. However, in a preferred method for preparing, for example, decachloroferrocene and pentachloroferrocene, the starting material is not isolated prior to the lithiation and chlorination steps. Thus, the reaction mixture recovered from the initial lithiation and chlorination steps is merely treated to remove organolithium compound and solvent, for example, by passing it through a column of alumina and removing the solvent by sublimation. The residue without further treatment is then subjected to the lithiation and chlorination steps. The described procedures are repeated three more times until the decachloroferrocene or pentachloroferrocene product is obtained. This latter process is the preferred one for preparing decachlorometallocenes and pentachlorometallocenes since much higher yields are obtained. Furthermore, the process is simplified, thereby rendering it less expensive to conduct since it is unnecessary to isolate a product after each series of lithiation and chlorination steps.

The reactions that occur in the four stage process for preparing decachloroferrocene are shown by the following equations:

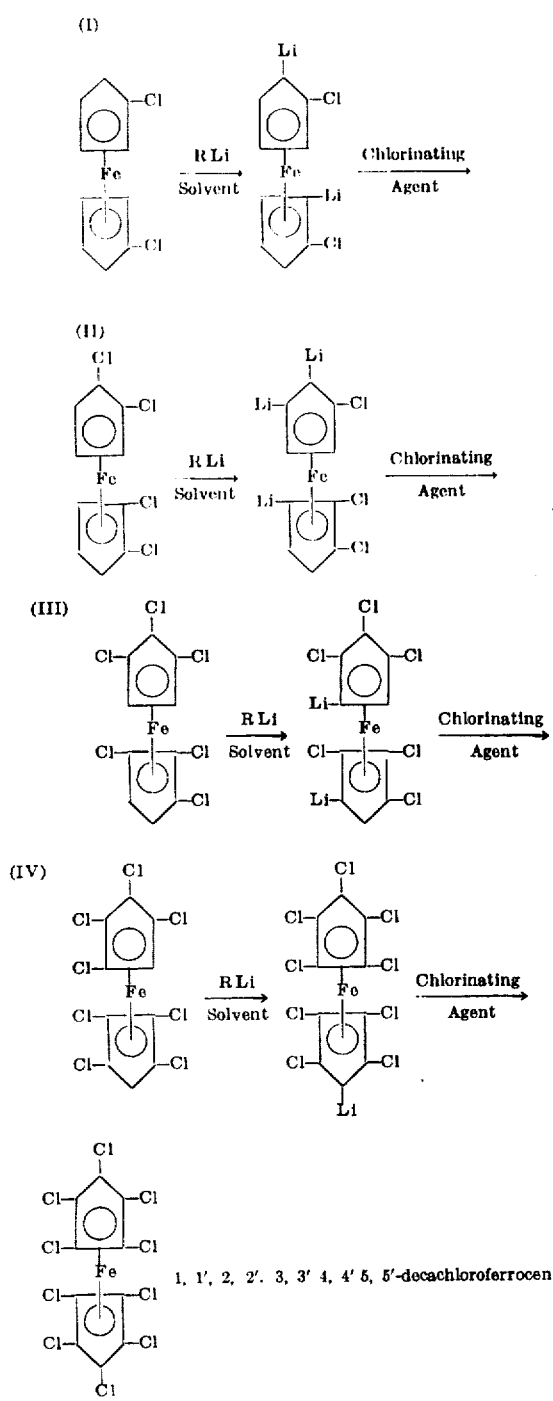

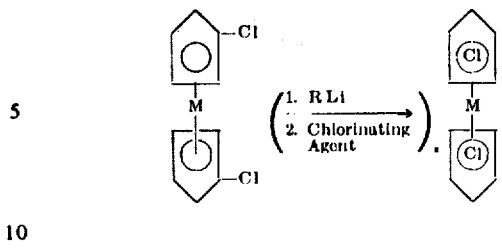

1, 1', 2, 2'. 3, 3' 4, 4' 5, 5'-decachloroferrocene

As seen from the foregoing, each of the four stages (I–IV) involves a lithiation step and a chlorination step. According to the illustrated process, 1,1',2,2'-tetrachloroferrocene, 1,1',2,2''-hexachloroferrocene, 1,1',2,2',3,3',4,4'-octachloroferrocene and 1,1',2,2',3,3',4,4',5,5'-decachloroferrocene are recovered as the product of each successive stage with each of the first three named products serving, respectively, as the starting material for the next successive stage.

The process described in the preceding paragraph can be conveniently termed an indirect process to distinguish it from the direct process for preparing decachloroferrocene (or pentachloroferrocene) in which the recovery of a partially chlorinated ferrocene at the completion of each of the first three stages is eliminated. The synthesis of a decachlorometallocene by the direct process can be represented by the following equation:

In the equation $x$ is an integer equal to the number of stages in the process and is at least 4 and is preferably equal to 5 when preparing decachloroferrocene. Furthermore, when preparing the decachlorometallocene by the direct process, a metallocene per se can be used as the starting material and six stages ($n=6$) are preferably conducted. Each stage of the process consists of two steps, i.e., (1) the lithiation step (RLi) followed by (2) the chlorination step (chlorinating agent). Upon completion of the fourth, fifth or sixth stage, the decachlorometallocene is recovered from the reaction mixture by any suitable means, such as by sublimation followed by recrystallization from a solvent.

The above discussion has been concerned with the preparation of polychlorinated ferrocenes in which 1,1'-dichloroferrocene is used as the initial starting material. As a result chlorine atoms are substituted for hydrogen atoms on both ferrocene rings. When chloroferrocene is utilized as the initial starting material, substitution occurs on only one ferrocene ring. The same reactions occur as represented above except that chlorine atoms replace hydrogen atoms on only one of the rings. Thus, in the indirect process when starting with chloroferrocene, 1,2-chloroferrocene, 1,2,3-chloroferrocene, 1,2,3,4-chloroferrocene, and 1,2,3,4,5-chloroferrocene are recovered as the product of each successive stage with each of the first three named products serving, respectively, as the starting material for the next successive stage.

The structure of the polychlorinated ferrocenes shown and described above has been substantiated by elemental analyses, GLC analyses, mass spectral analyses and the nmr spectra of the compounds. The molecular ion peaks, isotopic distributions, and fragmentation patterns were all in accord with the disclosed structures. The mass spectral fragmentation patterns showed the distribution of the chlorine atoms between the rings. The distribution of the chlorine atoms within the rings was obtained from the nmr spectra of the compounds. The nmr absorbance peaks for the compounds show that lithiation occurs in a position alpha to a chlorine atom. For 1,1',2,2',3,3',4,4'-octachloroferrocene and 1,2,3,4-tetrachloroferrocene, there is marked downfield shift in the absorbance of the lone proton in the substituted ring or rings. This proton must necessarily be flanked on each side by a chlorine atom in these two compounds. This observation coupled with the fact that the center alpha proton does not vary from the compounds containing a lesser number of chlorine atoms establishes that each of the substituted ring protons in 1,1',2,2'-tetrachloroferrocene, 1,1',2,2',3,3'-hexachloroferrocene, 1,2-dichloroferrocene and 1,2,3-trichloroferrocene is flanked by a single chlorine atom. Such a situation can only exist if the chlorine atoms are all located adjacent to one another.

Organolithium compounds that can be employed in the process of this invention correspond to the formula RLi, where R is a phenyl radical or an alkyl radical, preferably containing from one to four, inclusive, carbon atoms. Examples of suitable organolithium reagents include phenyllithium, methyllithium, ethyllithium, and n-butyllithium. It is generally preferred to employ n-butyllithium. While theoretically 1 or 2 mols of the organolithium compound per mol of the chlorinated metallocene can be used depending upon whether 1 or 2 hydrogen atoms are to be replaced with a lithium atom, it is usually preferred to utilize an excess of the organolithium. Thus, 1.1 to 2.5 mols of organolithium per mol of the metallocene compound are used when the substitution occurs in one of its rings and 2.2 to 5.0 mols per mol of the metallocene compound when the substitution takes place in both of its rings.

In conducting the first step of the process, i.e., the lithiation step of the first stage, it has been found to be advantageous to add with the organolithium compound, or immediately thereafter, an aliphatic diamine. Examples of suitable diamines include ethylenediamine, N,N,N',N'-tetramethylethylenediamine, and the like. It has been found that addition of the diamine, which forms a complex with the organolithium compounds, assures that a lithium atom will be substituted next to a chlorine atom. The addition of an aliphatic diamine to the first step is particularly important in the practice of the indirect process in which a particular polychlorinated metallocene, e.g., 1,1', 2,2'-tetrachloroferrocene or 1,2-dichloroferrocene, is separated from the reaction mixture of the first stage for use as the starting material in the lithiation step of second stage. Generally one mol of the diamine, or a small excess such as 1.1 mol, is added per mol of the organolithium compound.

As a chlorinating agent it is preferred to employ a 1,2-dichloroethane. Examples of suitable compounds include 1,2-dichloroethane, hexachloroethane, 1,2-dichlorotetrafluoroethane, 1,2-dichlorotetrabromoethane, and the like. Hexachloroethane is the preferred chlorinating agent. As with the organolithium compound, it is preferred to employ an excess amount of the chlorinating agent. Thus, from 2 to 10 mols of the chlorinating agent are usually used for each mol of the metallocene compound. When the metallocene has a lithium atom on one only ring, lesser amounts, e.g., 2 5 mols of the chlorinating agent can be used. However, greater amount, e.g., 4 to 10 mols of the chlorinating agent are generally employed when one lithium atom is attached to each ring of the metallocene.

The lithiation steps are conducted in the presence of a solvent for the chlorinated metallocenes. An ether solvent has been found to be particularly suitable, examples of which include diethylether, tetrahydropyrane, and tetrahydrofuran. It is usually preferred to use tetrahydrofuran. However, aliphatic hydrocarbons, such as those mentioned below can be used, particularly in the first stage of the process. The organolithium compound is usually added to the chlorinated metallocene an aliphatic hydrocarbon solvent. Examples of such solvents include pentane, hexane, heptane, octane and the like. Thus, in the lithiation step a dual solvent system is generally used, i.e., a mixture of an ether and an aliphatic hydrocarbon, both of which are inert to the reaction involved. The amount of solvent used is that which is sufficient to dissolve the ingredients. It is usually several volumes as compared to the volume of the ingredients in order to permit efficient stirring of the reaction mixtures.

The chlorination steps are also generally conducted in the presence of a solvent. The solvent used is preferably an aliphatic hydrocarbon of the type used in the lithiation steps, and as a practical matter the same solvent is employed in both steps. The criteria as to the amount of solvent used in the lithiation steps apply generally to the amount used in the chlorination steps. It is to be understood, however, that the chlorination steps can be conducted in the absence of a solvent.

In initial stages prior to the last stage of the process, both direct and indirect, the temperature during the lithiation and chlorination steps is maintained in the range of about 0° to 40° C., preferably in the range of about 15° to 25° C. During the last stage of the process, both direct and indirect, the temperature is maintained in the range of about −10° to 10° C., preferably from −5° to 5° C. All steps of the process are carried out in an inert atmosphere, such as under an atmosphere of nitrogen or argon.

The 1,1', 2,2', 3,3', 4,4', 5,5'-decachlorometallocenes prepared by the process of this invention undergo heteroannular dilithiation upon reaction with an organolithium compound, such as n-butyllithium, to give 1,1'-dilithiooctachlorometallocenes. These compounds are versatile intermediates which can, in turn, be used in providing a variety of substituted perchlorometallocenes. For example, they can be hydrolyzed to form 1,1', 2,2', 3,3', 4,4'-octachlorometallocenes which are useful as monomers. Thus, chlorine-containing polymers can be prepared by polymerizing the materials in the presence of a suitable catalyst. The 1,1-dilithiooctachlorometallocenes can also be reacted with iodine to form 1,1'-diiodooctachlorometallocenes and with carbon dioxide to form octachlorometallocene-1,1' dicarboxylic acids. The iodine-containing compounds are also useful as monomers, e.g., in polymerizations in the presence of a copper catalyst to prepare chlorine-containing metallocene polymers. The dicarboxylic acids can be reacted with an alcohol or polyol to form esters having a high chlorine content.

The decachlorometallocenes upon reaction with sodium methoxide in methanol form 1,1'-dimethoxyoctachlorometallocenes. Similarly, when decachlorometallocenes are reacted with sodium ethoxide in ethanol, 1,1'-diethoxyoctachlorometallocenes and isomers thereof are formed. In addition to the foregoing, the polychlorinated metallocenes of this invention are useful as lubricant additives and as flame retardant additives for polymeric materials.

In the foregoing discussion, ferrocenes have been specifically referred to in many instances. However, it is to be understood that the invention is not limited to such compounds but is applicable as well to ruthenocenes and osmocenes. Furthermore, where reference has been made to metallocenes, it is to be understood that ferrocenes, ruthenocenes and osmocenes are the intended compounds.

A better understanding of the invention can be obtained by referring to the illustrative examples described below that are not intended, however, to be unduly limitative of the invention. The runs described in the examples were carried out under an atmosphere of high purity nitrogen. The n-butyllithium solution in hexane used was found by titration to be 1.5 molar. The chloroferrocene and the 1,1' dichloroferrocene were prepared from ferroceneboronic acid and 1,1'-ferrocenediboronic acid, respectively, according to procedures described by A. N. Nesmeyanov et al. in Doklady Akad. Nauk SSSR, 100,1099 (1955). Gas liquid chromatography (GLC) analyses were performed on either an F&M Model 500 chromatograph or an F&M Model 402 chromatograph. Molecular weight determinations were carried out with a mass spectrometer. Chlorine isotope distributions obtained for the ferrocene derivatives and chlorine-ruthenium isotope distributions obtained for the ruthenocene derivatives were all in agreement with the calculated isotope patterns. For those compounds for which an exact mass determination was not made, the correct nominal mass was obtained for all peaks in the molecular ion cluster. Percentages where used are in weight percent.

EXAMPLE I

Preparation of 1,1', 2,2'-tetrachloroferrocene

A solution of 1,1'-dichloroferrocene (15.7g, 0.0616 mol) in hexane (900 ml) was stirred at 23° C. while a solution of n-butyllithium in hexane (100 ml, 0.15 mol) was added followed by the addition of tetramethylethylenediamine (TMEDA) (18.6g, 0.16 mol). The resulting reaction mixture was stirred for 50 minutes at 23° C. after which it was added over a 35 minute period to a stirred solution of hexachloroethane (47g, 0.20 mol) in hexane (300 ml). After completion of the addition, stirring was continued for 5 minutes, and the reaction mixture was filtered through a bed of alumina. The filtrate was concentrated to dryness and the residue was fractionally sublimed. After removal of hexachloroethane at 45° C. (0.25 mm of Hg), the product was sublimed at 120° to 125° C. (0.25 mm of Hg). The sublimate weighed 16.55g and by GLC analysis consisted of trichloroferrocene (>2%) and 1,1', 2,2'-tetrachloroferrocene (>98%). This represents an 83 percent yield of the latter compound. Recrystallization from hexane produced 1,1', 2,2'-tetrachloroferrocene having a melting point of 147° C. Analysis of this product gave the following results:

| Calculated ($C_{10}H_6Cl_4$ Fe),% | | Found,% |
|---|---|---|
| C | 37.09 | 37.10; 36.87 |
| H | 1.87 | 1.74; 1.91 |
| Cl | 43.80 | 43.86; 43.71 |
| Fe | 17.25 | 17.46; 17.21 |
| Mol. Wt. | 323.8543 | 323.8519 |

EXAMPLE II

Preparation of 1,1', 2,2', 3,3'-Hexachloroferrocene

A solution of 1,1',2,2'-tetrachloroferrocene (7.73g, 0.0238 mol) in dry tetrahydrofuran (THF) (700 ml) was stirred at 15° C. while a solution of n-butyllithium in hexane (100 ml, 0.15 mol) was added. The resulting reaction mixture was stirred for 2.5 hours at 15° C. and then added over a 20-minute period to a solution of hexachloroethane (48g, 0.20 mol) in hexane (400 ml). After addition was completed, stirring was continued for 5 minutes, and the reaction mixture was filtered through a bed of alumina. The filtrate was concentrated to dryness and the residue was fractionally sublimed. The product weighed 8.83g and by GLC analysis consisted of pentachloroferrocene (7%), 1,1', 2,2', 3,3'-hexachloroferrocene (92.5%), and heptachloroferrocene (0.5%). Recrystallization from hexane gave 6.17g of 1,1', 2,2', 3,3'-hexachloroferrocene, representing a yield of 66 percent. The melting point of the product was 191° C. Analysis of the product gave the following results:

| Calculated ($C_{10}H_4Cl_6$ Fe),% | | Found,% |
|---|---|---|
| C | 30.58 | 31.03; 30.97 |
| H | 1.03 | 1.03; 1.03 |
| Cl | 54.17 | 53.65; 53.78 |
| Fe | 14.22 | 14.87; 14.92 |
| Mol. Wt. | 391.7764 | 391.7755 |

EXAMPLE III

Preparation of 1,1', 2,2',3,3', 4,4'-Octachloroferrocene

Using 1,1', 2,2', 3,3'-hexachloroferrocene as the starting material, the procedure followed was the same as described in Example II, except that lithiation was carried out for 1.5 hours rather than 2.5 hours. From 1.40g of the starting material there was obtained 1.28g of product which by GLC analysis consisted of hexachloroferrocene (1.5%), heptachloroferrocene (15%), 1,1', 2,2', 3,3', 4,4'-octachloroferrocene (79%), nonachloroferrocene (3%) and decachloroferrocene (1.5%). Recrystallization from hexane produced 0.19g of 1,1', 2,2', 3,3', 4,4'-octachloroferrocene, representing a yield of 12 percent. The compound had a melting point of 21° C. Analysis of the product gave the following results:

| Calculated ($C_{10}H_2Cl_8$ Fe),% | | Found, % |
|---|---|---|
| C | 26.02 | 26.23; 26.09 |
| H | 0.44 | 0.57; 0.52 |
| Cl | 61.45 | 61.90; 61.84 |
| Fe | 12.10 | 11.91; 11.92 |
| Mol. Wt. | 461.6955 | 461.6933 |

EXAMPLE IV

Preparation of 1,1', 2,2', 3,3', 4,4', 5,5'-Decachloroferrocene

A solution of 1,1', 2,2', 3,3', 4,4'-octachloroferrocene (0.584g, 0.00126 mol) in dry THF (130 ml) was stirred at 0° C. for 1 hour while a solution of n-butyllithium in hexane (2.5 ml, 0.0037 mol) was added. The resulting reaction mixture was stirred at 0° C. for 1 hour after which hexachloroethane (2.37g, 0.010 mol) was added. Stirring was continued for 15 minutes and the reaction mixture was then filtered through a bed of alumina. The filtrate was concentrated to dryness and dry-column chromatography of the residue (hexane as eluent) produced 0.623g of material which by GLC analysis consisted of octachloroferrocene (1%), nonachloroferrocene (8%), and decachloroferrocene (91%). This mixture was dissolved in carbon tetrachloride and stirred with concentrated nitric acid for 29 hours. The carbon tetrachloride layer, which formed upon standing, was separated and passed through a column of alumina to give 0.565g of decachloroferrocene having a melting point of 245° to 246° C. This represents a yield of 85 percent while the overall yield of decachloroferrocene was 7 percent. The product was analyzed with the following results:

| Calculated ($C_{10}Cl_{10}F$ e),% | | Found,% |
|---|---|---|
| C | 22.64 | 22.82; 22.85 |
| Cl | 66.83 | 66.31; 66.32 |
| Fe | 10.53 | 9.75; 9.72 |
| Mol. Wt. | 529.6175 | 529.6120 |

EXAMPLE V

Preparation of Decachloroferrocene 1,1'-Dichloroferrocene (17.47g, 0.0686 mol) in hexane (1500 ml) was stirred at 23° C. while a solution of n-butyllithium (133 ml, 0.20 mol) followed by TMEDA (23g, 0.20 mol) was added. The resulting reaction mixture was stirred at 23° C. for 1 hour and then cooled to −70° C. Hexachloroethane (71g; 0.30 mol) was added and the temperature was allowed to rise to 10° C. over a 1-hour period. The reaction mixture was then extracted with water, and the hexane layer separated and concentrated to dryness. The hexachloroethane was removed by sublimation and the crude residue was reacted with n-butyllithium (200 ml, 0.30 mol) in dry THF (1 l) at 0° C. for 3 hours. The reaction mixture was cooled to −70° C., and hexachloroethane (95g, 0.40 mol) was added. The temperature was allowed to rise to 5° C. over a 1-hour period, and the reaction mixture was then passed through a column of alumina (THF as eluent). The solvent was distilled from the eluate at 23° C. in vacuuo and the hexachloroethane was removed by sublimation. The residue was subjected three more times to the above described reactions (lithiation and chlorination) and the corresponding work-up procedures, the sole modification being a decrease in the lithiation times to 2.5 hours, 1 hour and 30 minutes for the final three runs. The crude product from the last reaction, after removal of hexachloroethane by sublimation, was recrystallized from hexane to give 13.0g of decachloroferrocene of <96 percent purity by GLC. The residue from the mother liquor was stirred with a mixture of carbon tetrachloride and concentrated nitric acid for 5 hours and chromatographed on alumina to give an additional 2.2g of decachloroferrocene of >98 percent purity by GLC. The amount of product obtained (15.2g) represented a 42 percent yield of decachloroferrocene.

In Examples I–IV, decachloroferrocene and the several intermediates were produced by the indirect method. Example V demonstrates the use of the direct process in the preparation of decachloroferrocene. Because of the higher yields that can be obtained, the direct process is preferred in preparing decachlorometallocenes. Furthermore, the direct process is simpler and less expensive to practice because it is unnecessary to recover a pure intermediate after each chlorination step.

EXAMPLE VI

Preparation of Decachlororuthenocene

A solution of ruthenocene (11.55g, 0.05 mol) in hexane (1000 ml) was stirred and heated at reflux temperature while a solution of n-butyllithium in hexane (115 ml, 0.15 mol) was added. Heating was discontinued and TMEDA (22 ml, 0.15 mol) was added at a rate which maintained reflux. The reaction mixture was refluxed for 1 hour and then cooled to −20° C. Hexachloroethane (47.4g, 0.20 mol) was added and the temperature was allowed to rise to 10° C. over a period of 30 minutes. After removal by filtration of the solids present, the hexane filtrate was passed through a column packed with alumina. Hexachloroethane was eluted with petroleum ether, and the mixture of chlorinated ruthernocenes was eluted with carbon tetrachloride. The crude mixture, after removal of solvent, was subjected to the same reaction as described above, except that lithiation was carried out at 23° C. instead of a reflux temperature. The crude product obtained was dissolved in THF (500 ml) and stirred at −70° C. while a solution of n-butyllithium in hexane (200 ml, 0.30 mol) was added. The reaction mixture was warmed to 0° C. over a 30-minute period, stirred at 0° C. for 2 hours, and cooled to −70° C. Hexachloroethane (95g, 0.40 mol) was added, and the temperature was allowed to rise to 10° C. over a 1-hour period. The entire reaction mixture was then absorbed on alumina, and the THF removed by evaporation. Dry-column chromatography was carried out on the dried alumina to remove hexachloroethane upon elution with petroleum ether and to provide a crude mixture of chlorinated ruthenocenes upon elution with carbon tetrachloride. This mixture was subjected four more times to the above-described reactions in THF (lithiation and chlorination and the latter work-up procedure at the following lithiation temperatures and times: 0° C for 1 hour, 0° C. for 1 hour, −70° C. for 30 minutes, and −70° C. for 30 minutes. The product from the final reaction was recrystallized from heptane to give 4.2g of decachlororuthenocene having a purity >99 percent by GLC. This represented a product yield of 14 percent. The product showed some evidence of sublimation above 300° C. and decomposed at 360° to 365° C. Analysis of the product gave the following results:

|  | Calculated ($C_{10}Cl_{10}Ru$),% | Found,% |
|---|---|---|
| C | 20.86 | 20.88; 20.76 |
| Cl | 61.58 | 61.80; 61.77 |

The molecular ion cluster was a unique and complex pattern from 566 to 586 mass units which was identical with the pattern calculated for the compound.

EXAMPLE VII

Preparation of 1,2-Dichloroferrocene

A solution of chloroferrocene (4.42g, 0.02 mol) in dry THF (125 ml) was stirred at 0° C. while a solution of n-butyllithium in hexane (30 ml, 0.045 mol) was added. The resulting reaction mixture was stirred at 0° C. for 1.5 hours and then cooled to −78° C. A solution of hexachloroethane (14.2g, 0.060 mol) in hexane (50 ml) was added, and the reaction mixture was then allowed to warm to 0° C. over a 30 minute period. Subsequent work-up consisted of dry-column chromatography on alumina with hexane as the eluent. The excess hexachloroethane eluted first, followed by a yellow band from which, after solvent removal, there was obtained 3.48g of material determined by GLC to consist of 1,2-dichloroferrocene (81%) and a material (19%) determined by mass spectral analysis to be a trichloroferrocene. Recrystallization from methanol provided 1,2-dichloroferrocene having a melting point of 88° to 90° C. Analysis of the product gave the following results:

| Calculated ($C_{10}H_8Cl_2$ Fe),% | | Found,% |
|---|---|---|
| C | 47.11 | 47.39; 47.22 |
| H | 3.16 | 3.14; 3.05 |
| Mol. Wt. | 253.9351 | 253.9355 |

EXAMPLE VIII

Preparation of 1,2,3-Trichloroferrocene

The procedure used was the same as that described in Example VII in preparing 1,2-dichloroferrocene. From 4.50g of 1,2-dichloroferrocene, there was obtained 5.12g of material which by GLC analysis consisted of 1,2-dichloroferrocene (3%), 1,2,3-trichloroferrocene (86%), and tetrachloroferrocene (11%). Recrystallization from methanol provided 1,2,3-trichloroferrocene having a melting point of 103.5° to 104.5° C. Analysis of the product gave the following results:

| Calculated ($C_{10}H_7Cl_3$ Fe),% | | Found,% |
|---|---|---|
| C | 41.51 | 41.57; 41.46 |
| H | 2.44 | 2.47; 2.42 |
| Mol. Wt. | 287.8961 | 287.8982 |

EXAMPLE IX

Preparation of 1,2,3,4-tetrachloroferrocene

The procedure used was the same as that described in Example VII. From 0.70g of 1,2,3-trichloroferrocene, there was obtained 0.62g of material which by GLC analysis consisted of 1,2,3-trichloroferrocene (10%), 1,2,3,4-tetrachloroferrocene (80%) and pentachloroferrocene (10%). Preparative GLC provided 1,2,3,4-tetrachloroferrocene having a melting point of 81° to 82° C. Analysis of the product gave the following results:

| Calculated ($C_{10}H_6Cl_4$ Fe),% | | Found,% |
|---|---|---|
| C | 37.09 | 37.38; 37.12 |
| H | 1.87 | 1.86; 1.98 |
| Mol. Wt. | 323.8543 | 323.8599 |

EXAMPLE X

Preparation of 1,2,3,4,5-Pentachloroferrocene

A mixture of 1,2-dichloroferrocene (25%) and 1,2,3-trichloroferrocene (75%) was subjected to the reaction procedure described in Example VII to give a material consisting of 1,2,3-trichloroferrocene (42%), 1,2,3,4-tetrachloroferrocene (29%) and pentachloroferrocene (29%). Repetition of the reaction with this mixture gave a material consisting of 1,2,3,4-tetrachloroferrocene (42%) and 1,2,3,4,5-pentachloroferrocene (58%) together with a trace of hexachloroferrocene. This mixture was reacted in dry ethanol with excess n-butyllithium-hexane solution, followed by addition of hexachloroethane at 0° C. Dry-column chromatography provided a mixture of tetrachloroferrocene (20%), 1,2,3,4,5-pentachloroferrocene (70%) and hexachloroferrocene (10%). Recrystallization from methanol provided 1,2,3,4,5-pentachloroferrocene having a melting point of 143° to 144° C. Analysis of the product gave the following results:

| Calculated ($C_{10}H_5Cl_5$),% | | Found,% |
|---|---|---|
| C | 33.52 | 33.25; 33.53 |
| H | 1.41 | 1.41; 1.45 |
| Mol. Wt. | 357.8154 | 357.8144 |

EXAMPLE XI

Preparation of 1,1' Diiodooctachloroferrocene

A suspension of decachloroferrocene (1.00g, 0.00190 mol) in dry diethylether (175 ml) was stirred at −70° C. while a solution of n-butyllithium in hexane (3.8 ml, 0.0057 mol) was added. After 30 minutes at −70° C., an orange solution was present. Continued stirring for 30 minutes more produced a voluminous precipitate. Iodine (2.54g, 0.010 mol) was added, and the reaction mixture was warmed to 5° C. over a 40-minute period. Passage through a bed of alumina (methylene chloride as eluent) followed by removal of solvent produced 1.35g (99%) of 1,1'-diiodooctachloroferrocene having a purity of >98 percent of GLC. Recrystallization from hexane gave a product having a melting point of 240° C. Analysis of the product gave the following results:

|   | Calculated ($C_{10}Cl_8I_2Fe$),% | Found,% |
|---|---|---|
| C | 16.83 | 16.83; 16.74 |
| Cl | 39.75 | 39.54; 39.63 |
| I | 35.57 | 35.27; 35.41 |
| Fe | 7.82 | 8.01; 7.96 |

EXAMPLE XII

Preparation of Octachloroferrocene-1,1'-dicarboxylic acid

A solution of decachloroferrocene (0.80, 0.00151 mol) in dry THF (125 ml) was stirred at −70° C. while a solution of n-butyllithium in hexane (30 ml, 0.0045 mol) was added. The resulting deep orange solution was stirred for 10 minutes at −70° C. and then a molar excess of Dry Ice ($CO_2$) was added. The reaction mixture was stirred for 20 minutes while warming to 0° C. and then poured into 500 ml of water and extracted with hexane. The aqueous layer was acidified with 10 percent hydrochloric acid, resulting in a voluminous precipitate which was collected, washed with water and dried to give 0.81g (97 percent) of octachloroferrocene-1,1'-dicarboxylic acid after recrystallization from a mixture of THF and benzene. The product had a melting point of 245° C. Analysis of the product gave the following results:

|   | Calculated ($C_{12}H_2O_4Cl_8Fe$) | Found |
|---|---|---|
| C | 26.22 | 26.12; 26.37 |
| H | 0.36 | 0.31; 0.34 |
| Cl | 51.60 | 51.39; 51.36 |
| Fe | 10.16 | 10.48; 10.43 |

The infrared spectrum (KBr) showed an intense C O band at 1,680–1,695 cm$^{-1}$.

EXAMPLE XIII

Preparation of 1,1'-Diiodooctachlororuthenocene

A solution of decachlororuthenocene (0170g, 0.0012 mol) in dry THF (125 ml) was stirred at −70° C. while a solution of n-butyl-lithium in hexane (2.4 ml, 0.0036 mol) was added. After stirring at −70° C. for 15 minutes, iodine (2.0g, 0.0080 mol) was added, and the reaction mixture was warmed to 10° C. over a period of 40 minutes. Passage through a bed of alumina followed by removal of solvent left 0.89 (98%) of 1,1'-diiodooctachlororuthenocene. After recrystallization from hexane, the material showed sublimation above 300° C., darkening above 325° C. and iodine elimination above 350° C. Analysis of the product gave the following results:

|   | Calculated ($C_{10}Cl_8I_2Ru$),% | Found,% |
|---|---|---|
| C | 15.70 | 16.06; 15.83 |
| I | 33.19 | 32.72; 32.71 |
| Ru | 13.21 | 12.71 12.73 |

The mass spectrum of the compound, analogously to that of decachlororuthenocene, gave a "fingerprint" pattern identical with the calculated pattern.

EXAMPLE XIV

Lithiation and Hydrolysis of Decachloroferrocene

A solution of decachloroferrocene (0.411g, 0.00074 mol) in dry THF (75 ml) was cooled with liquid nitrogen until frozen. A solution of n-butyllithium in hexane (2.0 ml, 0.0030 mol) was added, and the reaction mixture was allowed to warm, with stirring, over a 15 minute period to −40° C. Distilled water (2 ml, 0.09 mol) was added giving a voluminous precipitate. Stirring was continued for 10 minutes while the mixture was allowed to warm to 0° C. The mixture was then filtered and the filtrate concentrated to dryness. Dry-column chromatography of the residue on alumina provided 0.359g (100%) of material which by GLC analysis consisted of pure 1,1', 2,2', 3,3', 4,4'-octachloroferrocene. GLC retention time, melting point and infrared spectrum were identical with those of an authentic sample.

EXAMPLE XV

Reaction of Decachloroferrocene with Sodium Methoxide

A mixture of decachloroferrocene (0.21g, 0.00040 mol) and sodium methoxide (0.5g, 0.01 mol) in methanol (125 ml) was stirred and refluxed for 18 for hours. Repeated analysis of the reaction mixture during this period was carried out by thin-layer chromatography (TLC) on silica gel with carbon tetrachloride as developer. A steady decrease in the intensity of the starting material ($R_f$=0.85) was noted, accompanied by the formation of two new compounds of $R_f$=0.62 and $R_f$=0.40, respectively. The formation of the latter compound at first appeared to be much slower than that of the former. However, the ration of the intensities of the latter to the former compound increased with time. After 18 hours, the reaction mixture was cooled, absorbed on alumina, and chromatographed on alumina. Two bands were eluted with carbon tetrachloride, but separation was not good. Subsequent re-chromatography on silica gel provided good separation of the two bands. The material from the first band weighed 0.15g (72%) and was determined by mass spectrometry to be methoxynonachloroferrocene. The material from the second band weighed 0.06g (28%) and was determined by mass spectrometry to be 1,1'-dimethoxyoctachloroferrocene. Both methoxy derivatives were soluble in all common solvents.

EXAMPLE XVI

Reaction of Decachloroferrocene with Sodium Ethoxide ratio

To a solution formed by dissolving sodium metal (0.80g, 0.035 mol) in absolute ethanol (175 ml) was added decachloroferrocene (1.00g, 0.00190 mol). The resulting mixture was stirred and refluxed for 59 days. At intervals during the reaction, samples were withdrawn and analyzed by TLC, GLC and mass spectrometry. In the following table, the percentages, as determined by GLC, of starting material, monoethoxy, diethoxy, triethoxy and tetraethoxy derivatives are shown at the indicated times:

TABLE

| Time, Hour | 1 | 4 | 6 | 43 | 112 | 208 | 384 |
|---|---|---|---|---|---|---|---|
| Starting Material,% | 2 | 0 | 0 | 0 | 0 | 0 | 0 |
| Monoethoxy Derivative,% | 95 | 50 | 25 | 0 | 0 | 0 | 0 |
| Diethoxy Derivative,% | 3 | 50 | 75 | 65 | 63 | 4 | 0 |
| Triethoxy Derivative,% | 0 | 0 | 0 | 30 | 60 | 74 | 76 |
| Tetraethoxy Derivative,% | 0 | 0 | 0 | 5 | 17 | 23 | 24 |

After 59 days (1,416 hours), the reaction mixture was cooled, absorbed on silica gel, and chromatographed. Carbon tetrachloride eluted two bands from which were obtained 0.192g (28%) of triethoxyheptachloroferrocene as an oil and 0.480g (72%) of tetraethoxyhexachloroferrocene as an oily solid. GLC of the triethoxy derivative showed two isomers of which the relative percentages in order of increasing retention time were 83 percent and 17 percent. GLC of the tetraethoxy derivative showed three isomers of which the relative percentages in order of increasing retention time were 59, 36 and 5 percent.

A second reaction was conducted under the same conditions as described above, using 0.10 mol of sodium ethoxide. The reaction mixture was worked up after 6 hours to give 0.81g (67%) of 1,1'-diethoxyoctachloroferrocene and 0.27g (22%) of triethoxyheptachloroferrocene. The former compound was recrystallized from hexane, giving a product having a melting point of 107° to 108° C. Analysis of the product gave the following results:

| | Calculated ($C_{14}H_{10}O_2Cl_8Fe$) | Found |
|---|---|---|
| C | 30.59 | 30.60; 30.46 |
| H | 1.83 | 2.21; 2.29 |
| Cl | 51.59 | 51.30 |
| Fe | 10.16 | 10.13 |

EXAMPLE XVII

Oxidative Stability of Highly Chlorinated Metallocenes

Runs were conducted to demonstrate the oxidative stability of highly chlorinated metallocenes.

1,1', 2,2', 3,3', 4,4'-octachloroferrocene and decachloroferrocene were each mixed with concentrated nitric acid at 23° C. Both compounds were undissolved after 10 minutes at 100° C. in the acid.

A carbon tetrachloride solution of each compound was stirred vigorously with concentrated nitric acid at 23° C. for 29 hours. The octachloroferrocene was destroyed while the decachloroferrocene was recovered unchanged.

The foregoing tests demonstrate that both compounds are resistant to oxidation with decachloroferrocene being the more highly resistant of the two. An important facet of this property of the highly chlorinated ferrocenes is that reactions in strong oxidizing environments, impossible with conventional ferrocene derivatives, can be carried out with these novel ferrocenes.

In another run decachlororuthenocene was dissolved in carbon tetrachloride and stirred at 23° C. with concentrated nitric acid. The compound was recovered unchanged after 68 hours, demonstrating the enhancement in oxidation stability for another highly chlorinated metallocene analogous to that obtained with the ferrocene compounds. It is noted that ruthenocene per se and ferrocene per se are both oxidized immediately by concentrated nitric acid.

Modifications of the present invention will become apparent to those skilled in the art upon consideration of the foregoing disclosure. Such modifications clearly come within the spirit and scope of the invention.

We claim:

1. As a new composition of matter, a polychlorinated metallocene selected from the group of compounds having the following structural formulas:

(1)

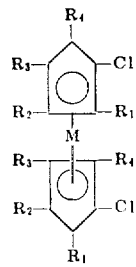

or (2)

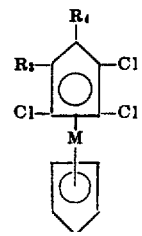

wherein M is a metal selected from the groups consisting of iron, ruthenium and osmium; $R_1$ is Cl, I, methoxy, ethoxy, Li or COOH; and $R_2$, $R_3$ and $R_4$ are each Cl or H, the $R_1$ group being I, $OCH_3$, $OC_2H_5$, Li or COOH only when $R_2$, $R_3$ and $R_4$ are each Cl, and each Cl atom being adjacent another Cl atom when $R_2$, $R_3$ or $R_4$ is Cl.

2. A composition according to claim 1 in which a polychlorinated metallocene has the structure of Formula (1) in which M is iron and $R_1$, $R_2$, $R_3$, and $R_4$ are each Cl.

3. A composition according to claim 1 in which a polychlorinated metallocene has the structure of Formula (1) in which M is ruthenium and $R_1$, $R_2$, $R_3$, and $R_4$ are each Cl.

4. A composition according to claim 1 in which a polychlorinated metallocene has the structure of Formula (1) in which M is iron, $R_1$ is I and $R_2$, $R_3$ and $R_4$ are each Cl.

5. A composition according to claim 1 in which a polychlorinated metallocene has the structure of Formula (1) in which M is iron, $R_1$ is L; and $R_2$, $R_3$ and $R_4$ are each Cl.

6. A composition according to claim 1 in which a polychlorinated metallocene has the structure of Formula (1) in which M is iron, $R_1$ is COOH and $R_2$, $R_3$ and $R_4$ are each Cl.

7. A composition according to claim 1 in which a polychlorinated metallocene has the structure of Formula (2) in which M is iron and $R_3$ and $R_4$ are each Cl.

8. A process for preparing a polychlorinated metallocene which comprises the following steps:

1. reacting a chlorinated metallocene selected from the group consisting of 1,1'-dichloroferrocene, 1,1'-dichlororutheneocene, 1,1'-dichlorosmocene, chloroferrocene, chlororutheneocene and chloroosmocene; with an organolithium compound having the formula RLi, where R is phenyl or alkyl, in the presence of a solvent for the chlorinated metallocene;

2. adding a chlorinating agent to the resulting reaction mixture; and recovering a reaction mixture containing a 1,1',2,2'metallocene selected is a dichlorometallocene or a 1,2-dichlorometallocene when the chlorinated metallocene selected is a chloro-metallocene.

9. The process according to claim 8 in which a 1,1',2,2'-tetrachlorometallocene or a 1,2-dichlorometallocene is separated from said reaction mixture; said 1,1',2,2'-tetrachlorometallocene or said 1,2-dichlorometallocene is reacted with said organolithium compound; a chlorinating agent is added to the resulting reaction mixture; and a second reaction mixture is recovered containing a 1,1',2,2', 3,3'-hexachlorometallocene when a 1,1',2,2'-tetrachlorometallocene is a reactant or a 1,2,3,-trichlorometallocene when a 1,2-dichlorometallocene is a reactant.

10. The process according to claim 9 in which a 1,1',2,2',3,3'-hexachlorometallocene or a 1,2,3-trichlorometallocene is separated from said second reaction mixture; said 1,1',2,2',3,3'-hexachlorometallocene or said 1,2,3-trichlorometallocene is reacted with said organolithium compound; a chlorinating agent is added to the resulting reaction mixture; and a third reaction mixture is recovered containing a 1,1',2,2'',4,'-octachlorometallocene when a 1,1',2,2',3,3'-hexachlorometallocene is a reactant or a 1,2,3,4-tetrachlorometallocene when a 1,2,3-trichlorometallocene is a reactant.

11. The process according to claim 10 in which a 1,1',2,2',3,3',4,4'-octachlorometallocene or a 1,2,3,4-tetrachlorometallocene is separated from said third reaction mixture; said 1,1',2,2''4,4'-octachlorometallocene or said 1,2,3,4-tetrachlorometallocene is reacted with said organolithium compound; a chlorinating agent is added to the resulting reaction mixture, and a fourth reaction mixture is recovered containing a 1,1',2,2'3,3',4,4',5,5'-decachlorometallocene when a 1,1',2,2',3,3',4,4'-octachlorometallocene is a reactant or a 1,2,3,4,5-pentachlorometallocene when a 1,2,3,4-tetrachlorometallocene is a reactant.

12. The process according to claim 11 in which said fourth reaction mixture contains 1,1',2,2',3,3',4,4',5,5'-decachloroferrocene.

13. The process according to claim 11 in which said fourth reaction mixture contains 1,1',2,2',3,3'4,4',4,4'-decachlorouthenocene.

14. The process according to claim 11 in which said fourth reaction mixture contains 1,2,3,4,5-pentachloroferrocene.

15. The process according to claim 8 in which said chlorinated metallocene is reacted in step (1) with a complex of said organolithium compound and an aliphatic diamine.

16. The process according to claim 15 in which said organolithium compound is n-butyllithium and said aliphatic diamine is N,N,N',N'-tetramethylethylenediamine.

17. A process for preparing 1,1',2,2',3,3',4,4',5,5'-decachloroferrocene which comprises the following steps:
 1. reacting 1,1'-dichloroferrocene with an organolithium compound having the formula RLi, where R is phenyl or alkyl, in the presence of a solvent for said dichloroferrocene;
 2. adding a chlorinating agent to the resulting reaction mixture;
 3. recovering a first reaction mixture containing chlorinated ferrocenes;
 4. separating said chlorinated ferrocenes from said first reaction mixture;
 5. reacting said chlorinated ferrocenes with said organolithium compound in the presence of said solvent;
 6. adding a chlorinating agent to the resulting reaction mixture;
 7. recovering a second reaction mixture containing chlorinated ferrocenes;
 8. repeating steps (4), (5), (6), (7), and (8) in succession three additional times, using respectively, as a starting material said second and a third and a fourth reaction mixture containing chlorinated ferrocenes;
 9. recovering a fifth reaction mixture containing chlorinated ferrocenes; and
 10. separating decachloroferrocene from said fifth reaction mixture.

18. A process according to claim 17 in which said organolithium compound is n-butyllithium and said chlorinating agent is hexachloroethane.

19. A process according to claim 17 in which lithiation step (1) and chlorination step (2) and all subsequent lithiation and chlorination steps except the last lithiation and chlorination steps are conducted at a temperature in the range of about 0° to 40° C., and the last lithiation and chlorination steps are conducted at a temperature in the range of about −5° to 5° C.

20. A process for preparing 1,1',2,2',3,3',4,4',5,5'-decachlororuthenocene which comprises the following steps:
 1. reacting ruthenocene with an organolithium compound having the formula RLi, where R is phenyl or alkyl, in the presence of a solvent for said ruthenocene;
 2. adding a chlorinating agent to the resulting reaction mixture;
 3. recovering a first reaction mixture containing chlorinated ruthenocenes;
 4. separating said chlorinated ruthenocenes from said first reaction mixture;
 5. reacting said chlorinated ruthenocenes with said organolithium in the presence of said solvent;
 6. adding a chlorinating agent to the resulting reaction mixture;
 7. recovering a second reaction mixture containing chlorinated ruthenocenes;
 8. repeating steps (4), (5), (6) and (7) in succession four additional times, using, respectively, as a starting material said second and a third, a fourth and a fifth reaction mixture, each containing chlorinated ruthenocenes;
 9. recovering a sixth reaction mixture containing chlorinated ruthenocenes; and
 10. separating decachlororuthenocene from said sixth reaction mixture.

21. A process according to claim 20 in which said organolithium compound is n-butyllithium and said chlorinating agent is hexachloroethane.

22. A process according to claim 20 in which lithiation step (1) and chlorination step (2) and all subsequent lithiation and chlorination steps except the last lithiation and chlorination steps are conducted at a temperature in the range of about 0° to 40° C., and the last lithiation and chlorination steps are conducted at a temperature in the range of about −5° to 5° C.

* * * * *